United States Patent [19]

Kitamura

[11] Patent Number: 4,738,572
[45] Date of Patent: Apr. 19, 1988

[54] MACHINE TOOL
[75] Inventor: Koichiro Kitamura, Takaoka, Japan
[73] Assignee: Kitamura Machinery Co., Ltd., Japan
[21] Appl. No.: 828,991
[22] Filed: Feb. 13, 1986
[30] Foreign Application Priority Data
  Jan. 29, 1986 [JP] Japan .................................. 61-15966
[51] Int. Cl.[4] .......................... B23B 29/30; B23C 1/12
[52] U.S. Cl. ........................................ 409/211; 29/40; 408/35
[58] Field of Search ................. 29/40, 26 A; 409/201, 409/211; 408/35; 144/1 A; 279/4 R

[56] References Cited
U.S. PATENT DOCUMENTS
  3,263,300  8/1966  Schatzman et al. ............... 29/26 A
  3,792,869  2/1974  Braun ....................................... 279/4
  4,229,866 10/1980  Berthier ............................. 29/26 A
  4,313,478  2/1982  Suzuki ............................ 409/201 X Primary Examiner—Z. R. Bilinsky
Attorney, Agent, or Firm—Lorusso & Loud

[57] ABSTRACT

A machine tool has a base (6), a XY table (5) arranged at the base (6) for holding a work (W) thereon in such a way that the XY table (5) can move together with the work (W) in a first direction and a second direction perpendicular to the first direction, means (2, 3) for controlling the XY table (5), an indexing table (17, 67) placed above the XY table (5) in such a manner that the indexing table (17, 67) can move for the indexing purpose, and a plurality of spindle heads (24, 25, 44, 45) attached to the indexing table (17, 67).

1 Claim, 4 Drawing Sheets

MACHINE TOOL

BACKGROUND OF THE INVENTION

This invention relates to a machine tool such as a milling machine.

Although various machine tools ahve been used and proposed, they have only a single spindle head. Users recently need various capabilities such as a low-speed heavy cutting or high-speed light cutting of work due to different work materials. For example, work made of non-ferrous metal such as aluminum is cut at a high speed.

Users can buy either machine tools for use in high-speed light cutting or machine tools for use in low-speed heavy cutting. For example, it both high-speed light cutting and low-speed heavy cutting must be carried out, two types of machine tools must be separately bought.

SUMMARY OF THE INVENTION

The object of this invention is to provide a machine tool which can be used commonly for the high-speed light cutting purpose and the low-speed heavy cutting purpose.

According to this invention, a machine tool is provided which includes a plurality of spindle heads attached to a common turn table so that any desired one of the spindle heads can be exchangeably selected.

BRIEF DESCRIPTION OF THE DRAWINGS

Two preferred embodiments of this invention will now be described by way of example with reference to the accompanying drawings in which.

DESCRIPTION OF THE PREFERRED EMBODIMENTS

Figure 1:
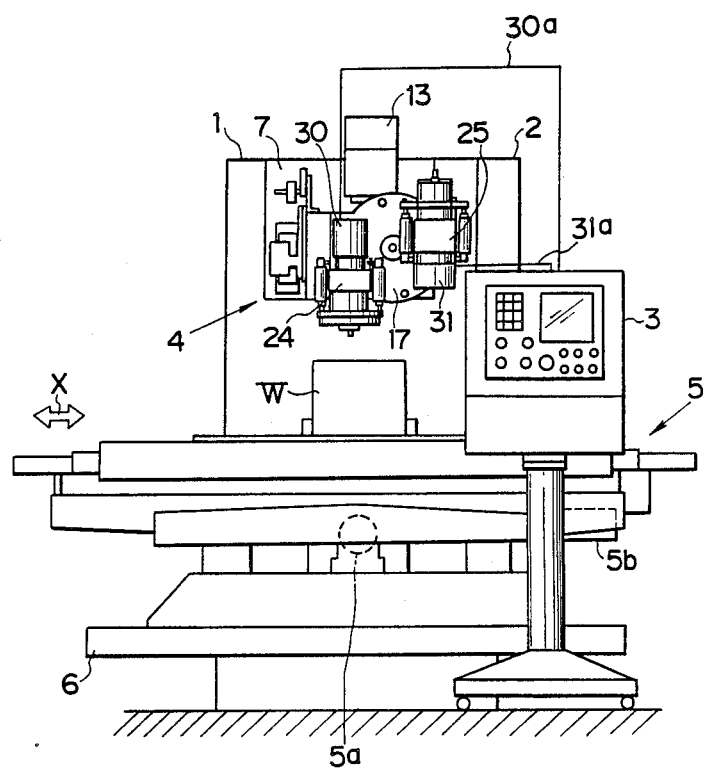
FIG. 1 is a schematic front view showing a machine tool according to a preferred embodiment of this invention.
Figure 2:
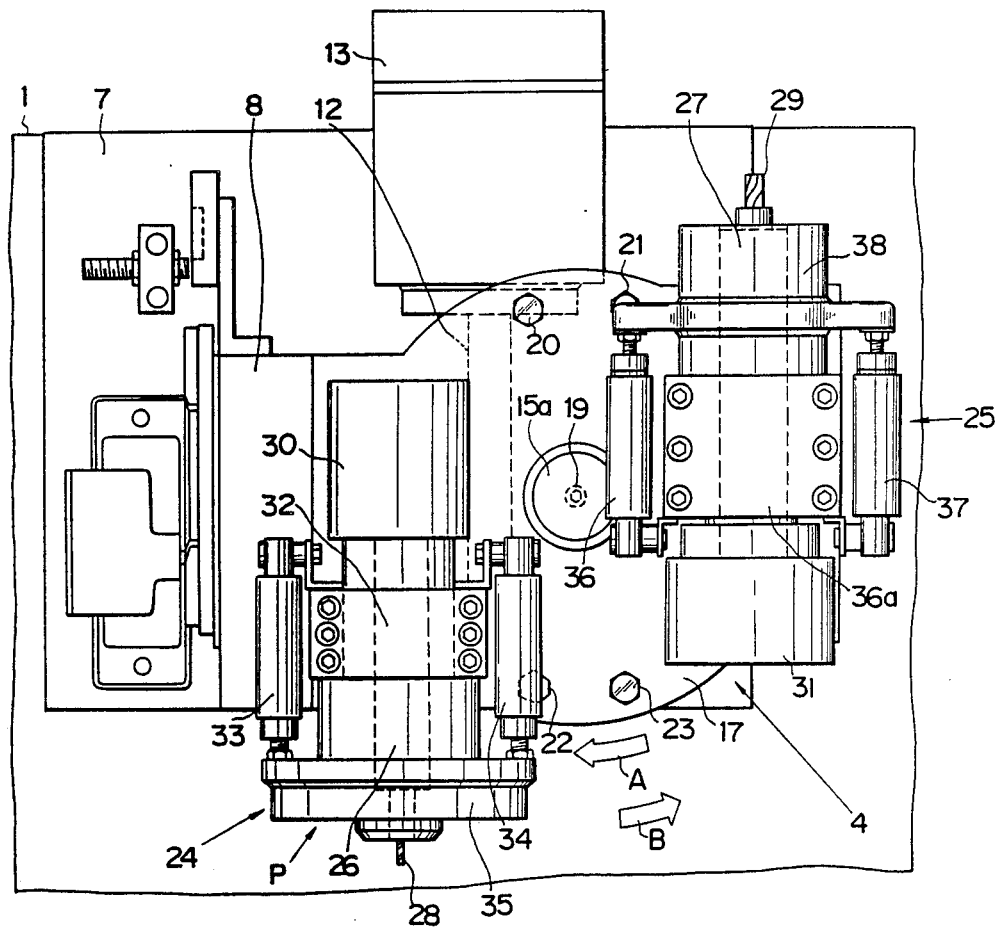
FIG. 2 is an enlarged front view showing a spindle head exchange unit and related members of the machine tool shown in FIG. 1.
Figure 3:
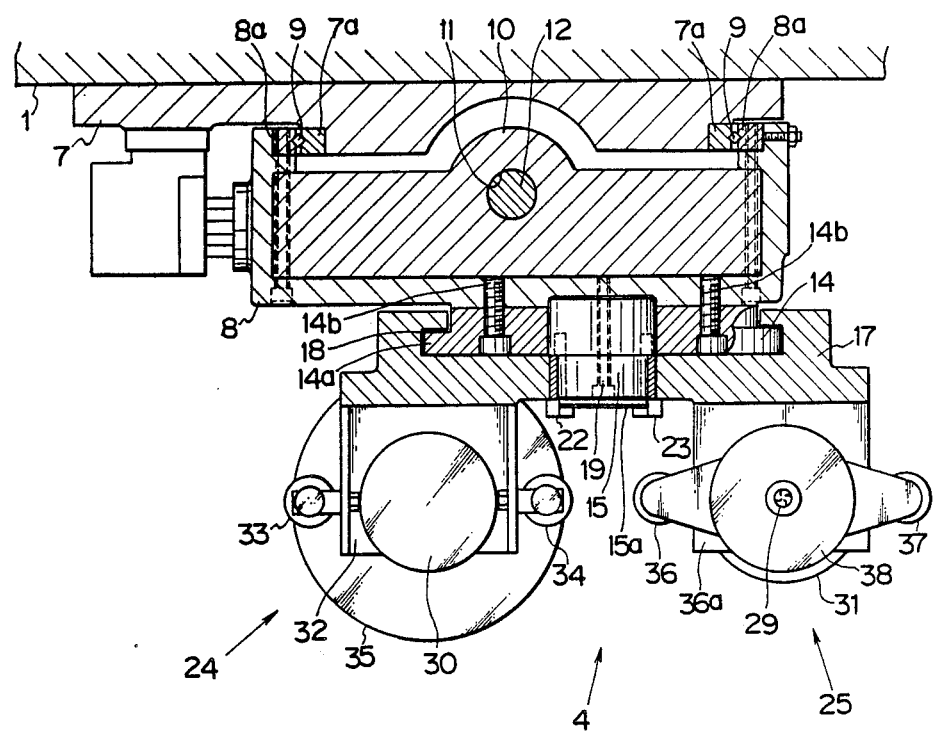
FIG. 3 shows a horizontal section of the machine tool shown in FIG. 2 and particularly the spindle head exchange unit thereof and related members.

FIGS. 1 through 3 show a first embodiment of this invention. A machine tool according to this invention is a vertical milling machine, for example. A machine tool 1 has a NC machine 2, a control unit 3, a spindle head exchange unit 4 and a XY table 5.

The XY table 5 is set on a base 6. The XY table 5 can be moved by a motor 5b in a first direction of arrow X in FIG. 1 and also moved by a motor 5a in a second direction perpendicular to the direction of arrow X. The motors 5a, 5b are actuated according to the programmed instructions set in the NC machine 2. A work W to be cut is set in position on the XY table 5.

The machine tool 1 has a stationary saddle 7 as shown in FIGS. 2 and 3. A slide 8 is slidable along the saddle 7 in a vertical direction. A plurality of guide rollers 9 are disposed between a guide portion 8a of the slide 8 and a guide portion 7a of the saddle 7.

The slide 8 has a slide body 10 in which a vertical female screw 11 is formed. The female screw 11 engages a feed screw 12 connected to an output shaft of a motor 13 (FIG. 2). The slide 8 can move up and down by actuation of the motor 13.

A circular plate 14 is fixed to a front portion of the slide 8 by means of plural bolts 14b. A cylindrical block 15 extends through the center of the circular plate 14 and is fixed therein. A spindle head exchange unit 4 is attached to the circular plate 14 in such a way that the spindle head exchange unit 4 can turn around the circular plate 14 if desired. The spindle head exchange unit 4 is provided with an indexing table such as a turn table 17 having a circular groove 18 in which a peripheral edge portion 14a of the circular plate 14 is slidably inserted. The cylindrical block 15 extends through the turn table 17 at its center in such a manner that the turn table 17 can turn about the cylindrical block 15. The cylindrical block 15 is fixed to the slide 8 by means of a bolt 19 which extends through the full length of the block 15 and is fixedly screwed in the slide 8. A cover 15a is attached to a front portion of the block 15.

The turn table 17 is to be indexed with respect to the circular plate 14 by means of four index bolts 20, 21, 22, 23. The index bolt 22 is under the index bolt 20 while the index bolt 23 is under the index bolt 21. A distance between the index bolt 20 and the fixing bolt 19 is equal to that between the bolt 19 and the index bolt 23. A distance between the index bolt 21 and the fixing bolt 19 is equal to that between the fixing bolt 19 and the index bolt 22.

Two spindle heads 24, 25 are fixed to the turn table 17. As shown in FIG. 2, a cutter tool 28 is attached to an end portion of a spindle 26 of the spindle head 24. A cutter tool 29 is attached to an end portion of a spindle 27 of the spindle head 25. These cutter tools 28, 29 may be carbide tools.

The spindle head 24 is equipped with a motor 30 which is a spindle motor running at 5000–35000 r.p.m. The spindle head 25 is provided with a motor 31 which is an air spindle motor running at 20000–120000 r.p.m.

An air cylinder 33 is attached at its one end to a bracket 32 of the spindle head 24. A further air cylinder 34 is attached at its one end to the bracket 32. The other ends of the air cylinder 33 and 34 are fixed to a chucking head portion 35 of the spindle head 24. By actuating the air cylinders 33, 34, the chucking head portion 35 moves up and down so that the cutter tool 28 can be chucked or released. If the cutter tool 28 is released, it can be taken out of the spindle 26.

One end of an air cylinder 36 is attached to a bracket 36a of the spindle head 25. One end of an air cylinder 37 is attached to the bracket 36a. The other ends of the air cylinders 36 and 37 are attached to a chucking head portion 38 of the spindle head 25. By actuating the air cylinders 36, 37, the chucking head 38 moves up and down so that the cutter tool 29 is chucked or released. If the cutter tool 29 is released, the cutter tool 29 can be taken out of the spindle 27.

In a condition as shown in FIG. 2, the cutter tool 28 is oriented downwardly while the cutter tool 29 is oriented upwardly. The spindle head 24 is used only for the low-speed heavy cutting purpose. The spindle head 25 is used only for the high-speed light cutting purpose.

The motors 30, 31 are electrically connected by way of cables 30a, 31a to the control unit 3 which in turn is electrically connected to the NC machine 2. The actuation of the motors 30, 31 is controlled according to the control signals sent from the control means 3 on the basis of the programmed instructions of the NC machine 2 with respect to their revolution speeds and on-off operations. The motor 13 is also controlled according to the programmed instructions of the NC machine 2. Incidentally, the motors 13, 5a, 5b may be servomotors.

The operation of the machine tool will now be explained.

If a work made of a steel is to be heavily cut at a low speed, the spindle head 24 is set in a predetermined position P as shown in FIG. 2. The turn table 17 is indexed with respect to the circular plate 14 by means of the index bolts 20–23. The cutter tool 28 directly faces the work W as shown in FIG. 1.

The motor 30 is actuated thereby to rotate the cutter tool 28 at a given speed in a desired direction. Also, the motor 13 is actuated so as to have the turn table 17 and the slide 8 together move down to a predetermined lower position. As a result, the cutter tool 28 moves down together with the spindle head 24 and begins to cut the work W at a low speed.

After cutting the work W, the motor 13 is actuated in a reverse direction whereby the turn table 17, the slide 8 and the spindle head 24 together move up to their original upper position. Thereafter, the motor 30 stops.

If another work W made of non-ferrous metal such as aluminum is to be cut lightly at a high speed, the index bolts 20–23 are removed and then the turn table 17 is manually turned in a direction of the arrow A in FIG. 2 by 180 degrees. After that, the turn table 17 is again fixed by the index bolts 20–23. Thus, the turn table 17 is indexed so that the spindle head 25 is set in a desired position P. The cutter tool 29 now directly faces the work W.

The motor 31 is actuated so as to rotate the cutter tool 29 at a given high speed. While the motor 13 is actuated, the turn table 17, the slide 8 and the spindle head 25 together come to a predetermined lower position. Thus, the cutter tool 29 begins to cut the work W lightly at a high speed.

After the work W is completely cut, the motor 13 is actuated in a reverse direction so that the turn table 17 moves up to its original upper position. After that, the motor 31 stops.

If a further work W made of a steel is cut heavily at a low speed, the index bolts 20–23 are again removed and then the turn table 17 is manually turned 180 degrees in the direction B as shown in FIG. 2. After that, the turn table 17 is again fixed by the index bolts 20–23. As a result, the turn table 17 is indexed, and the spindle head 24 is set in the desired position P. In this case, the cutter tool 28 faces the work W.

The motor 30 is actuated thereby to rotate the cutter tool 28 at a given low speed. When the motor 13 is actuated, the turn table 17 moves down to a predetermined lower position together with the slide 8 and the spindle head 24. Thus, the cutter tool 28 cuts the work W at a low speed.

After the work W is cut, the motor 13 is actuated in a reverse direction so that the turn table 17 moves up to an original upper position. After that, the motor 30 stops.

Figure 4:
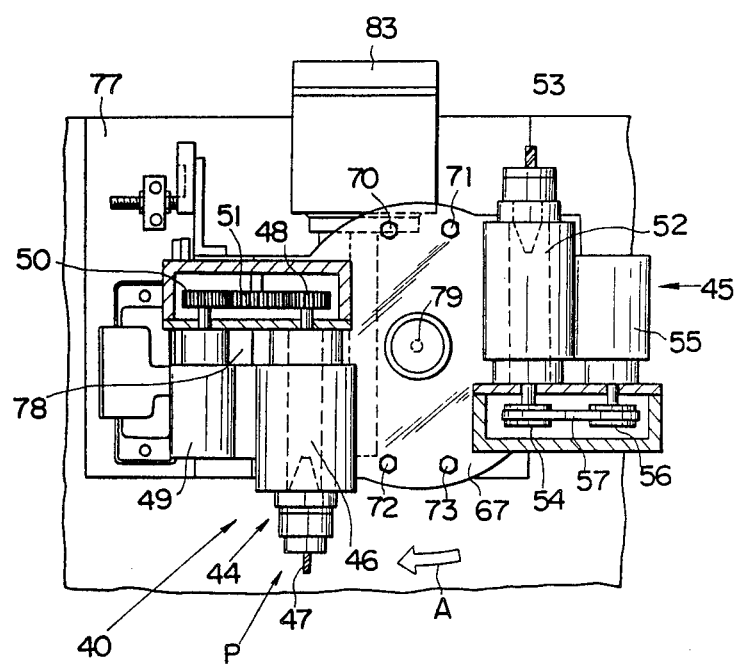
FIG. 4 is a schematic front view showing a machine tool according to a further preferred embodiment of this invention.

FIG. 4 shows a second embodiment of this invention which is similar to the embodiment of FIGS. 1 to 3 except for the construction of the driving means. Two spindle heads 44, 45 are arranged on a turn table 67 of a spindle head exchange unit 40. The spindle head 44 is set in a predetermined position P. The spindle head 44 is for use in low-speed heavy cutting. The spindle head 45 is used for the high-speed low cutting purpose. A cutter tool 47 is detachably attached to a spindle 46 of the spindle head 44. The cutter tool 47 may be attached thereto by a collet type chuck (not shown), for example. A gear 48 is fixed to the spindle 46. The spindle head 44 is provided with a motor 49 running, for example, at 20–5000 r.p.m. A gear 50 is fixed to an output shaft of the motor 49. A gear 51 engages the gears 50 and 48 so that rotation of the motor 49 is transmitted through the gears 50, 51, 48 and the spindle 46 to the cutter tool 47.

A cutter tool 53 is detachably attached to a spindle 52 of the spindle head 45. The cutter tool 53 may be attached thereto by a conventional collet type chuck (not shown). A pulley 54 is fixed to the spindle 52. The spindle head 45 is equipped with a motor 55 which can run at 1000–1500 r.p.m. A pulley 56 is fixed to an output shaft of the motor 55. A belt 57 is arranged on both the pulleys 56 and 54 so that rotation power of the motor 55 is transmitted by way of the pulley 56, the belt 57, the pulley 54, the spindle 52 to the cutter tool 53.

A turn table 67 is substantially the same as the turn table 17 shown in FIG. 2. The turn table 67 is constructed to be fixed to a circular plate (not shown) corresponding to the circular plate 14 as shown in FIG. 3 by means of plural index bolts 70–73. Also, a saddle 77 is substantially the same as the saddle 7 of FIG. 2. A slide 78 is substantially the same as the slide 8 in FIG. 2. The motor 83 is also similar to the motor 13 of FIG. 2. Thus, the turn table 67, the circular plate, the saddle 77, and the slide 78 and other elements will not be explained in detail.

The turn table 67 may be turned manually around a bolt 79 after the index bolts 70–73 are removed. If the turn table 67 is turned 180 degrees in the direction of arrow A, the spindle head 45 is set in a desired position P. After that, the index bolts 70–73 are again set so as to index the turn table 67 in such a desired position.

This invention is not limitted only to the above-stated embodiments. For instance, although in the embodiments shown in the drawings the turn tables are manually turned, they can be turned by an automatic indexing attachment (not shown) so as to set a plurality of spindle heads in their desired positions. Three spindle heads or more can be arranged on a single turn table in a single spindle head exchange unit, for example, for accomplishing a low-speed heavy cutting purpose, a high-speed light cutting purpose and an intermediate cutting purpose. In such a case, also, the spindle heads can be exchanged manually or automatically in a simple manner.

Instead of a turn table, some other indexing table may be used in a machine tool according to this invention for arranging a plurality of spindle heads, for example, by sliding the supporting member, the spindle heads can be set in a desired position.

Although in the embodiments shown in the drawings the turn table is constructed to move up and down, the XY tables can be constructed to move up and down while the turn table is fixed.

It should be understood that this invention can be applied also to a horizontal milling machine and other machine tools.

I claim:

1. A machine tool comprising:
   a base;
   a XY table mounted on said base for supporting a workpiece thereon;

positioning means for moving said XY table, together with any workpiece thereon, in a first horizontal direction and in a second horizontal direction perpendicular to the first horizontal direction;
a support member extending vertically upward from said base and first guide means provided on said support member;
means for controlling operation of said positioning means said controlling means including a control unit and a NC machine, said motors being electrically connected to the control unit which in turn is electrically connected to the NC machine so that the motors are controlled on the basis of control signals sent from the control unit according to programmed instructions of the NC machine;
a slide member slidably mounted on said support member for vertical movement relative to said XY table and second guide means provided on said slide member, said first guide means engaging said second guide means through a plurality of guide rollers;
a circular plate having a peripheral tongue and fixed to said slide;
a spindle head exchange unit including a turntable rotatably mounted on said circular plate above the XY table, said turntable having a circular groove which opens radially inward and which holds said tongue so that the turntable may be manually rotated with respect to said plate for indexing;
means for manually indexing said turntable including a plurality of index bolts for releasably securing the turntable in an indexed position;
at least a pair of spindle heads mounted along parallel axes of rotation on opposite sides of the index bolts, each of said pair of spindle heads being adapted to hold a tool in an operative position;
a first motor for rotatably driving one of said pair of spindle heads and a second motor for rotatably driving the other spindle head of said pair, said first motor being operable over a first speed range and said second motor being operable over a second speed range different from said first speed range; and
a chucking head, associated with each of said spindle heads, for selectively chucking or releasing a tool and pneumatic means for moving said chucking heads axially, said pneumatic means including at least a pair of diametrically opposed cylinders mounted parallel and exterior to the associated spindle head, one end of each cylinder of said pair being fixed to said chucking head and an opposite end of each cylinder being fixed to said associated spindle head.

* * * * *